United States Patent

Suzudo et al.

[11] Patent Number: 6,026,101
[45] Date of Patent: Feb. 15, 2000

[54] SOLID-STATE LASER APPARATUS

[75] Inventors: Tsuyoshi Suzudo, Natori; Takunori Taira, Fukui, both of Japan

[73] Assignee: Ricoh Company, Ltd., Tokyo, Japan

[21] Appl. No.: 08/924,822

[22] Filed: Sep. 5, 1997

[30] Foreign Application Priority Data

Jun. 9, 1996 [JP] Japan ................................ 8-255386

[51] Int. Cl.[7] .................................................. H01S 3/10
[52] U.S. Cl. ................ 372/22; 372/11; 372/21; 372/19; 372/27; 372/92; 372/99
[58] Field of Search ................... 372/92, 98, 22, 372/21, 34, 19, 27, 11

[56] References Cited

U.S. PATENT DOCUMENTS

| 5,123,025 | 6/1992 | Papuchon et al. | 372/21 |
|---|---|---|---|
| 5,123,026 | 6/1992 | Fan et al. | 372/22 |
| 5,181,214 | 1/1993 | Berger et al. | 372/34 |
| 5,278,851 | 1/1994 | Goto | 372/22 |
| 5,331,650 | 7/1994 | Maeda et al. | 372/22 |
| 5,343,485 | 8/1994 | Okazaki | 372/22 |
| 5,497,388 | 3/1996 | Goto et al. | 372/22 |
| 5,588,014 | 12/1996 | Okazaki et al. | 372/22 |
| 5,636,232 | 6/1997 | Goto | 372/22 |

FOREIGN PATENT DOCUMENTS 6-88979   3/1994   Japan .

OTHER PUBLICATIONS

Takunori Taira, et al., Applied Optics, vol. 34, No. 21, pp. 4298–4301, Jul. 20, 1995, Intracavity Frequency Doubling and Q Switching in Diode–Laser–Pumped ND:YVO$_4$ Lasers.

*Primary Examiner*—Leon Scott, Jr.
*Attorney, Agent, or Firm*—Oblon, Spivak, McClelland, Maier & Neustadt, P.C.

[57] ABSTRACT

A high powered solid-state laser apparatus that is small in size and low in cost. The solid-state laser apparatus includes a semiconductor laser, a laser crystal, an etalon element, a non-linear wavelength converting element, and an output mirror, which are used to reduce the number of the fundamental wave length mode pieces, thereby raising an efficiency of the Q-switch. Thus, an output power of the laser is increased.

63 Claims, 6 Drawing Sheets

“hopping” on a rise-time of the high-voltage pulse. This
SOLID-STATE LASER APPARATUS

BACKGROUND OF THE INVENTION

1. Field of the Invention

The present invention relates to a solid-state laser apparatus, and in particular to a solid-state laser apparatus for use in an optical pick-up and an optical printer apparatus.

2. Description of the Related Art

In recent years, the cost of a high-power semiconductor laser (e.g. laser diode) has decreased and with research the development and product design of a solid-state laser apparatus using a semiconductor laser has become prosperous. A solid-state laser apparatus using an exciting type semiconductor laser has a very high efficiency because of a smaller spectrum width of an exciting source. In addition, since the laser exciting source is small, the solid-state laser apparatus can also be miniaturized. Further, with the solid-state laser apparatus, a successive oscillation of high power and a high quality beam at room temperature can be realized. In addition, the solid-state laser apparatus is superior in an accumulative property of energy and a stability of frequency.

Figure 5:
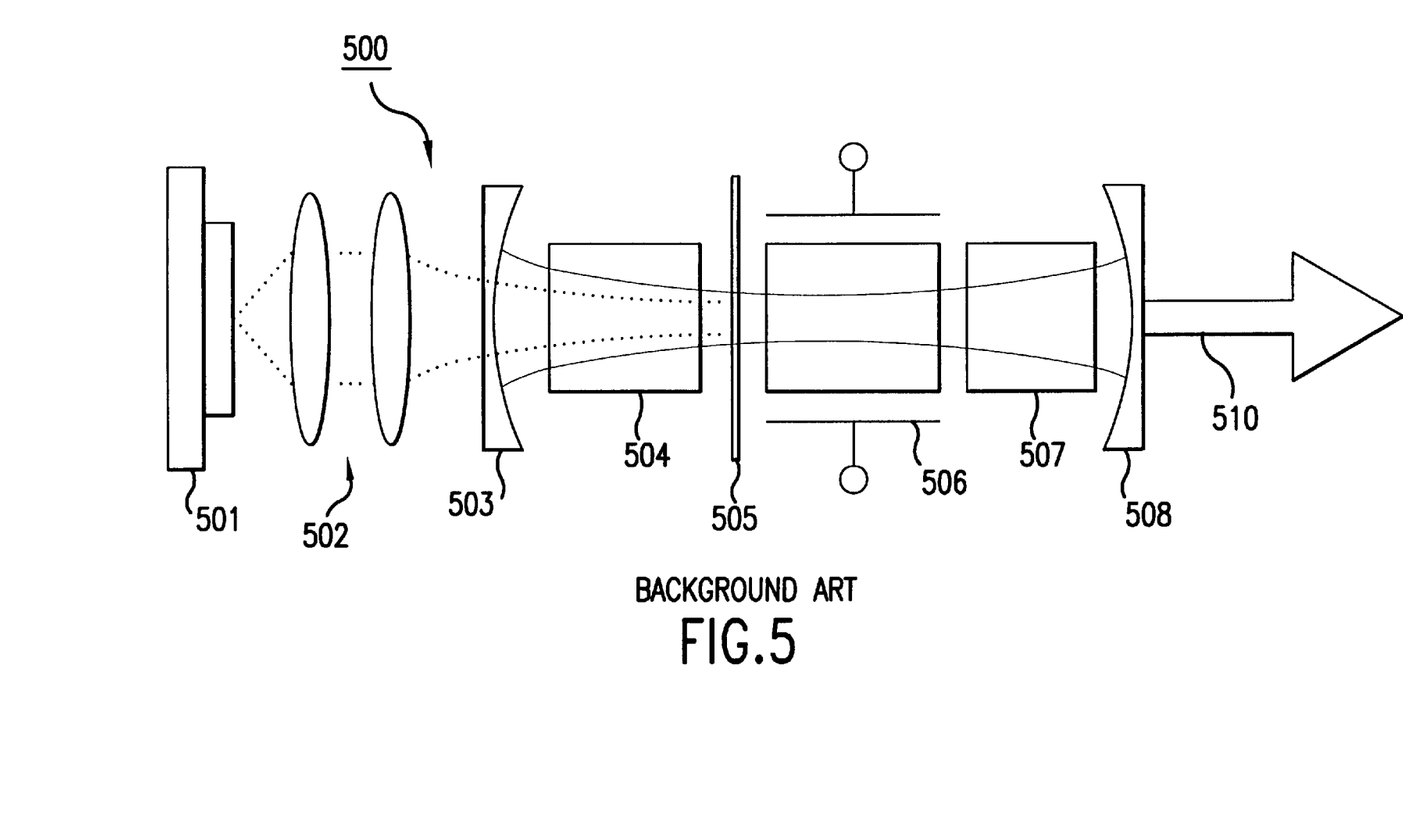
FIG. 5 is a diagram illustrating a construction of a background solid-state laser apparatus.

FIG. 5 shows a structure of a background semiconductor laser exciting Q switch-SHG (Second Harmonics Generation) solid-state laser apparatus. The solid-state laser apparatus 500 includes a semiconductor laser 501 used for excitation, a focusing lens group 502, a rear mirror 503, a laser crystal 504, a polarizing plate 505, an optoelectronic crystal 506 for use in a Q switch, an output mirror 507 and a two-times wave (i.e., twice the frequency of a fundamental frequency) generating non-linear optical crystal 508.

In order to realize a Q switch operation, the Q switch optoelectronic crystal 506 is inclined by 45° from the direction of the polarizing plate 505 in relation to an advance phase axis and a delay phase axis of the crystal.

Further, electrodes (not shown) for applying a high voltage pulse are provided on upper and lower surfaces of the Q switch optoelectronic crystal 506. When the high-voltage pulse is not applied to the Q switch optoelectronic crystal 506, the optoelectronic crystal 506 operates as a ¼ wavelength plate (hereinafter referred to as a $\lambda/4$ plate). On such occasion, since the Q value of the resonator can be limited to a small value, laser oscillation is not performed.

On the other hand, in the case of applying the high-voltage pulse to the Q switch optoelectronic crystal 506, the Q switch optoelectronic crystal 506 operates as an 0-wavelength plate. Then, the Q value of the resonator is large and thereby laser oscillation is performed. Consequently, a high-peak voltage output can be realized. Furthermore, a reflection coefficient (reflectance) of the output mirror 507 can be set to a state of almost total reflection for a laser oscillation fundamental wave, and the reflectance of the output mirror 507 can also be set to a state of almost total transmission for a wave with a frequency two times that of the laser oscillation fundamental wave (hereinafter referred to as a two-times wave). Therefore, the non-linear optical crystal 508 can effectively generate a high-peak output 510 of the two-times wave.

However, the solid-state laser apparatus 500 discussed above has a problem in that the number of parts needed is large and energy loss occurs due to controlling the direction of polarization with the polarizing plate 505. With a large number of parts, the apparatus becomes larger in size and more expensive.

Figure 6:
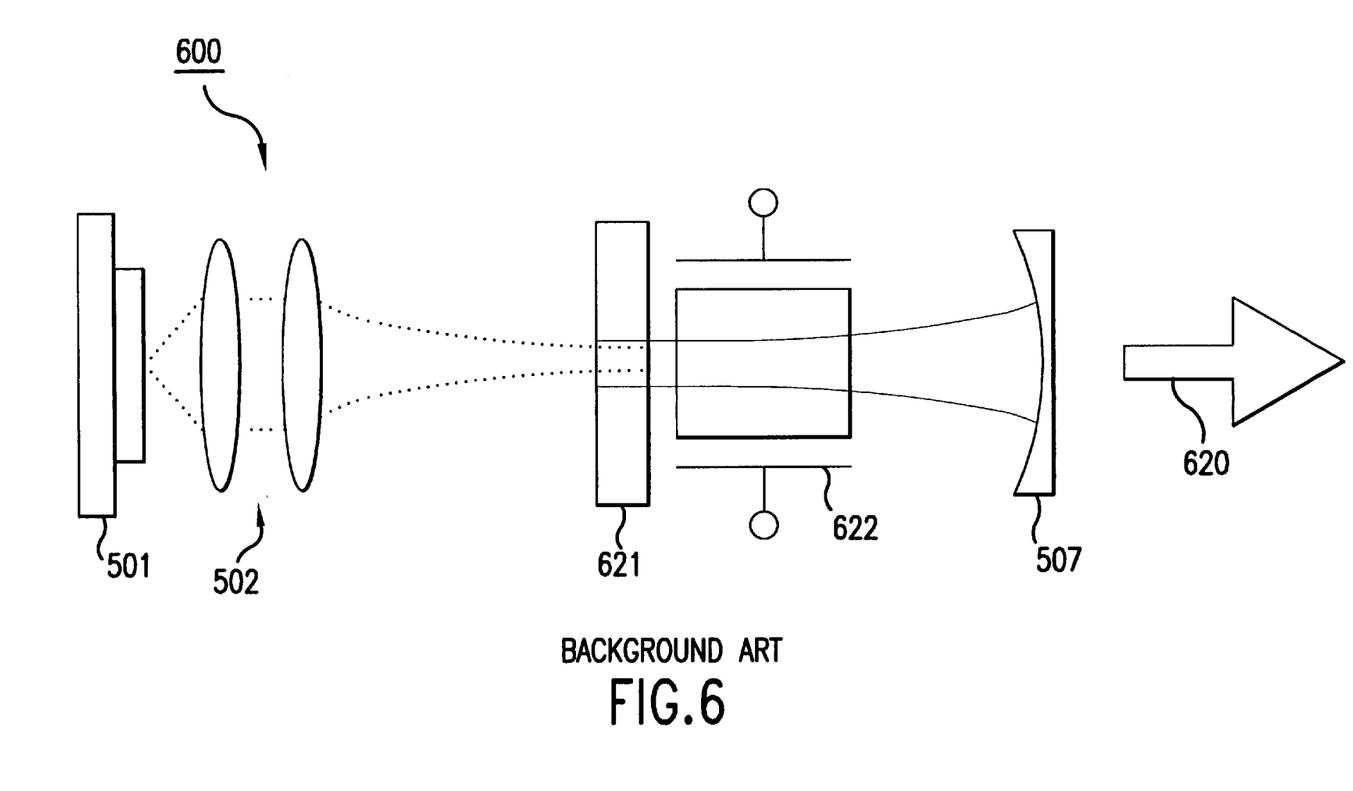
FIG. 6 is a diagram illustrating a construction of another background solid-state laser apparatus.

The Japanese Laid-open Patent Publication No.6-088879/1994 discusses a solid-state laser apparatus employing a Q switch-SHG complex element to solve such a problem. FIG. 6 shows the construction of a solid-state laser apparatus discussed in this publication.

The solid-state laser apparatus 600 includes of a semiconductor laser 501 used as an exciter, a focusing lens 502, a laser crystal 621, a Q switch-SHG non-linear optical crystal 622, and an output mirror 507. The laser crystal 621 includes a Nd:YVO$_4$ crystal, and a KTP (KTiOPO$_4$) crystal is included in the Q switch-SHG non-linear optical crystal 622.

The construction of the solid-state laser apparatus 600 is similar to that of the above-mentioned laser apparatus 500. However, the effect of the polarizing plate 505 (Refer to FIG. 5) is created by the laser crystal 621 and the effect of the Q switch optoelectronic crystal 506 (Refer to FIG. 5) is created by the Q switch-SHG non-linear optical crystal 622. Consequently, the number of the employed parts can be reduced, and therefore the size and cost of the apparatus can be reduced.

In more detail, the laser crystal 621 realizes a straight polarization output by utilizing a difference of an inductive radiation cross-sectional square measure in an a-axis direction and a c-axis direction of the Nd:YVO$_4$ crystal. Namely, the inductive radiation cross-sectional square measure in the c-axis direction of the Nd:YVO$_4$ crystal is almost four times that of the a-axis direction. The laser oscillation of straight polarization is performed by the difference therebetween. Consequently, in the device of FIG. 6 it is not necessary to include the polarizing plate 505 (as shown in FIG. 5).

In addition, since the KTP (KTiOPO$_4$) crystal included in the Q switch-SHG non-linear optical crystal 622 not only operates as the SHG crystal, but has an optoelectronic effect, it is possible to realize the complex operation of the SHG and the Q switch. Consequently, the Q switch element does not need to be prepared individually, and thereby the apparatus can be further miniaturized.

However, the solid-state laser apparatus 600 has a problem in that the maximum output is approximately 230 W, which is insufficient as a Q switch laser light source (see Applied Optics, 35, 4298–4301 (1995)). The reason for this is that the fundamental wave of the oscillating laser becomes longitudinal multiple mode, and thereby the Q switch effect is lowered. Even though the Q switch-SHG non-linear optical crystal 622 utilizes the optoelectronic effect of the KTP crystal, the fundamental wave of the laser is longitudinal multiple mode resulting in a phenomenon in which the wavelength of the laser fundamental wave has an effect of "hopping" on a rise-time of the high-voltage pulse. This hopping is due to a wavelength dispersion effect of the KTP crystal and becomes prominent with longitudinal multiple mode waves. As a result, a peak output is reduced. This problem can be solved by setting the rise-time of the Q switch high-voltage pulse to 0~1 ns. However, the cost for such a power source is high.

Further, there exists an influence on an up-conversion process due to the high-powered two-times wave incident on the laser crystal. Semiconductor laser light rays (having a wavelength of 809 nm) are directed as incident light rays in order to excite the fundamental wave thereof. However, the fundamental wave of the laser is unexpectedly excited more or less, even with the two-times laser light rays (having the wavelength of 532 nm).

SUMMARY OF THE INVENTION

Accordingly, one object of this invention is to solve the aforementioned problems.

Another object of this invention is to provide a novel high-powered solid-state laser apparatus which is smaller in size and lower in cost.

These and other objects are achieved by providing a solid-state laser apparatus which includes a laser crystal, a semiconductor laser which excites the laser crystal, and a resonator which generates an oscillating fundamental laser wave. In addition, a polarization controlling element (a non-linear optical crystal) is included which changes a polarization of the oscillating fundamental laser wave. The optical crystal converts a frequency of the oscillating fundamental laser wave to another frequency which is twice the frequency of the oscillating fundamental laser wave. In addition, a frequency selecting element is included in the resonator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

The preferred embodiments of the present invention are described in detail hereinafter. The present invention is not limited to the embodiments described below.

A solid-state laser apparatus relating to a first embodiment of the present invention includes an exciting semiconductor laser, a focusing optical system, a resonator rear mirror, a laser crystal, a frequency selecting element, a Pockels cell/wavelength converting complex-operation element, and a resonator output mirror.

The Pockels cell exerts a Pockels effect which is an optoelectric effect. The Pockels cell has electrodes attached to it and includes a crystal capable of exerting the Pockels effect (optoelectric effect). Further, the Pockels cell can be used as an optical modulation element. There are two systems in relation to a method of applying an electric field; a lateral light-intensity modulating system of applying an electric field in a direction perpendicular to a light propagating direction, and a longitudinal light-intensity modulating system of applying an electric field in a direction parallel with a light propagating direction.

In the latter system, a ring-shaped electrode or transparent electrode is used, and a KDP, ADP, BNN, or LiTaO3 crystal is used as a piezoelectric crystal having a large Pockels effect. In addition, a semiconductor is used with a laser oscillation frequency fit to an absorption wavelength of the aforementioned laser crystal.

Further, it is necessary to include a temperature adjusting mechanism in the semiconductor laser for the purpose of preventing a variation of the semiconductor laser's temperature and a shifting of the wavelength, both of which are due to an ambient temperature variation and an electric current injection.

With regard to the aforementioned resonator rear mirror, a side end surface at an exciting side of the laser crystal is coated with a dielectric substance so that a transmission coefficient is high for the oscillating wavelength of the exciting semiconductor laser. In addition, a reflection coefficient (reflectance) is made high for both a laser fundamental wavelength and a laser two-times wavelength. Moreover, the other surface of the laser crystal is also coated with the dielectric substance so that a transmission coefficient of the mirror is high for the laser fundamental wavelength and the laser two-times wavelength.

In addition, an etalon element is used for the frequency selecting element. The etalon element includes two parallel plain reflection mirrors opposed to each other which both have small transmission coefficients. The etalon element can be used as a high-resolution interference meter which is capable of making a sharp interference stripe. Although the distance between surfaces of the reflection mirrors can be changed, it is also possible to fix the distance therebetween by inserting a spacer. Since it is difficult to arrange the reflection surfaces of the mirrors precisely in parallel with each other, the distance therebetween is made constant (fixed). Further, the etalon element is widely used for measuring an refractive index of a gas or for precisely measuring a length. The etalon element can also be used as an interference light separator.

With regard to the aforementioned Pockels cell/wavelength conversion complex-operation element, both side ends are coated with a dielectric substance so as to raise the transmission coefficient for the laser fundamental wavelength and the laser two-times wavelength. Furthermore, this element is treated with an electrode coating (e.g., a metal film) such that a high-voltage pulse can be applied in a crystal axis direction having a large optoelectronic effect.

The aforementioned resonator output mirror is a concave-surface mirror (made of an optical glass material) which has a curvature radius matched to the resonator length. Further, the laser output mirror is coated with a dielectric substance such that the reflection coefficient (reflectance) is high for the laser fundamental wavelength and the transmission coefficient is high for the laser two-times wavelength.

Next, an operation of the solid-state laser apparatus according to a first embodiment of the present invention will be described. First, light rays emitted from the semiconductor laser are directed onto the laser crystal as incident light rays after passing through the focusing optical system. In the laser crystal, the exciting light rays are absorbed and a fluorescence of the laser fundamental wavelength is generated. Then, the fluorescence reciprocates repeatedly in the laser resonator and causes dielectric emission, thereby causing laser oscillation.

As stated previously, if a high-voltage pulse is not applied to the Pockels cell, the Pockels cell operates as a $\lambda/4$ plate and a polarizing direction of the laser fundamental wave rotates by 90°. As a result, the Q value (which is one of the resonator parameters) becomes low, and thereby laser oscillation does not occur. On the other hand, if the high-voltage pulse is applied to the Pockels cell, the Pockels cell operates as a 0-wavelength plate, and the laser oscillation starts to occur. Therefore, the crystal is put in a state of forced excitation since laser oscillation was not occurring previously when the voltage was not applied. When the laser oscillation starts, the stored energy is discharged therefrom and a high-peak laser output can be obtained.

To effectively convert the laser fundamental wave to the laser two-times wave, a non-linear material having a large optical effect is employed as the Pockels cell. The oscillating laser fundamental wave is locked up in the resonator, and thereby the conversion efficiency can be made large. The efficiency of the wavelength conversion is proportional to a square of the power of the laser fundamental wave incident onto the non-linear crystal. In such a situation, by utilizing a large power of the laser fundamental wave in the interior of the resonator, a large output of the laser two-times wave can be achieved. In addition, the frequency selecting element is used to select the frequency of the oscillating laser fundamental wave.

The construction of the solid-state laser apparatus according to a second embodiment of the present invention is similar to that of the first embodiment. However, in the second embodiment the aforementioned frequency selecting element is not included. Instead, the side end surface at the exciting side of the laser crystal is coated with a dielectric substance such that the transmission coefficient is made high for the oscillation wavelength of the exciting semiconductor laser. In addition, the reflection coefficient (reflectance) is also made high for the laser fundamental wavelength and the laser two-times wavelength. Further, the other end surface is coated with a dielectric substance such that the surface has a partial reflection coefficient for the laser fundamental wavelength and the transmission coefficient is made large for the laser two-times wavelength. Therefore, the laser crystal has the same effect as that of the frequency selecting element discussed in the first embodiment.

Further, the operation of the solid-state laser apparatus is similar to that discussed previously and therefore it will not be discussed here.

In another embodiment of the present invention, a solid-state laser apparatus similar to that of the second embodiment is used, except the side end surface at the resonator side of the laser crystal has a partial reflection coefficient for the laser fundamental wavelength and the reflection coefficient is made high for the laser two-times wavelength. In such a construction, the laser two-times wave is not directed into the laser crystal as incident light.

Figure 1:
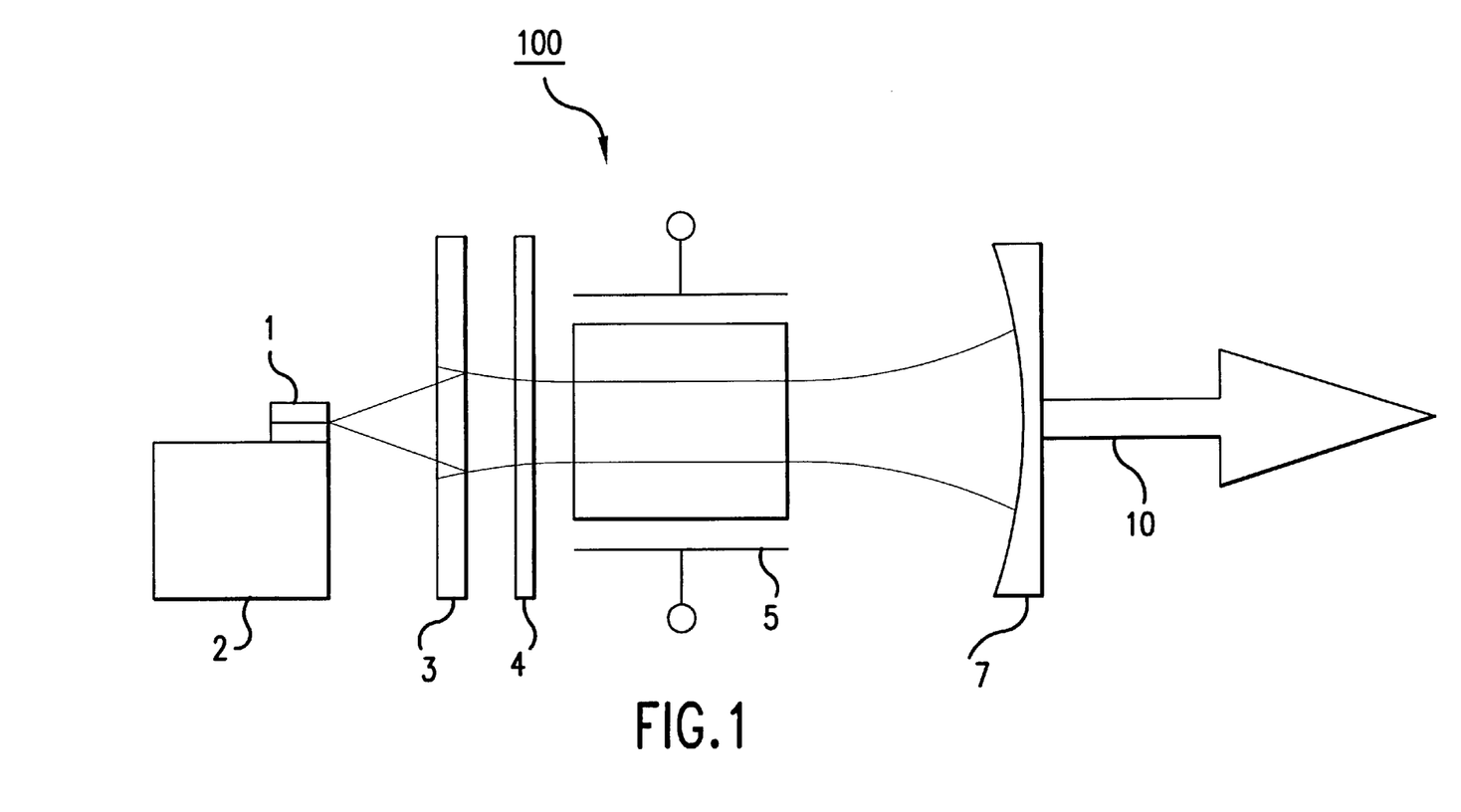
FIG. 1 is a diagram illustrating a construction of a solid-state laser apparatus according to a first embodiment of the present invention.

Referring now to the drawings, wherein like reference numerals designate identical or corresponding parts throughout the several views, and more particularly to FIG. 1 thereof, a laser apparatus 100 of a first embodiment of the present invention includes a semiconductor laser 1, a thermo-module (T-E cooler)/heat radiating copper block (cooling element) 2, a laser crystal 3, an etalon element 4, a non-linear wavelength conversion element 5, and an output mirror 7.

The semiconductor laser 1 may be a single-stripe semiconductor laser using a wavelength of 809 nm and a maximum output of 1 W. Since the stripe width is 100 μm, the size of light emission is also about 100 μm. In order to match the light emission waveform of the semiconductor laser 1 to the absorption property of the laser crystal 3, the semiconductor laser 1 is cooled by use of the thermo-module (T-E cooler)/heat-radiating copper block 2.

In addition, a Nd:YVO$_4$ crystal may be employed as the laser crystal 3 with a density of Nd equal to 1.0 at %. Further, a thickness of the laser crystal 3 in an optical axis direction may be 1 mm and a surface perpendicular to the optical axis may have a longitudinal width of 3 mm and a transverse width of 3 mm. The Nd:YVO$_4$ crystal is disposed such that a c-axis of the crystal coincides with a polarizing direction of the semiconductor laser 1. Further, a side end surface at a side of the semiconductor laser 1 is coated with dielectric substance multiple layer film so that the reflection coefficient is 99.9% for the laser fundamental wave (light having a wavelength of 1064 nm), the reflection coefficient is 99.9% for the laser two-times wave (light having a wavelength of 532 nm), and the transmission coefficient is 95% for the exciting light from the semiconductor laser 1 (light having a wavelength of 809 nm).

On the other hand, the other side end surface at the side of the laser resonator is also coated by a dielectric substance multiple layer film such that the transmission coefficient is 99.9% for the laser fundamental wave (light having a wavelength of 1064 nm), and the transmission coefficient is 99.9% for the laser two-times wave (light having a wavelength 532 nm).

In the etalon element 4, an optical glass (BK-7) having a thickness 0.5 mm may be used. The surface thereof is treated by polishing and is not coated with a dielectric substance (such as a reflection preventing film and/or the light reflecting film, etc.).

In addition, A KTP crystal may be employed for the non-linear wavelength converting element (Pockels cell) 5 as the Q switch for generating the second harmonic wave. Both side end surfaces of the KTP crystal are coated with a dielectric multiple layer film so that the transmission coefficient is 99.9% for the laser fundamental wave (light having a wavelength of 1064 nm), and the transmission coefficient is 99.9% for the laser two-times wave (light having a wavelength of 532 nm).

Furthermore, the KTP crystal is disposed such that an angle between the c-axis direction of the KTP crystal and the c-axis direction of the Nd:YVO$_4$ crystal is 45° in order to realize TYPE 11 phase matching. In addition, the KTP crystal may have a thickness in the light axis direction of 5 mm, in the c-axis direction of 1 mm, and in the other direction of 3 mm. Further, the KTP crystal may have $\theta=90°$ and $\phi=23.4°$. (Hereupon, $\theta$ and $\phi$ are respectively specified angles of the KTP crystal.) The electrode of the KPT crystal is disposed so as to apply an electric field in the c-axis direction thereof in order to apply the Q switch high-voltage pulse thereto.

The same optical glass (BK-7) as that of the etalon element 4 may be used as the fundamental material for the output mirror 7. The output mirror 7 has a concave surface having a curvature radius of, e.g., 50 mm. For this reason, the resonator length becomes almost 25 mm. In addition, the surface of the output mirror 7 is coated with a dielectric substance multiple layer film so that the reflection coefficient is 99.9% for the laser fundamental wave (light having a wavelength of 1064 nm), and the transmission coefficient is 95% for the laser two-times wave (light having a wavelength of 532 nm).

Next, an operation of the solid-state laser apparatus 100 is explained. At first, the laser crystal 3 (Nd:YVO$_4$ crystal) is excited by the semiconductor laser 1, and thereby a laser light beam having a wavelength of 1064 nm (which is the laser fundamental wave) is generated.

When a high-voltage pulse is not applied to the KPT crystal 5, the KPT crystal 5 operates as $\lambda/4$ plate for the laser fundamental wave in the laser resonator, and thus the laser fundamental wave is rotated by 90° when the polarizing direction of the laser fundamental wave reciprocates in the laser resonator. Accordingly, laser oscillation is suppressed. However, since the exciting of the Nd:YVO$_4$ crystal by the semiconductor laser 1 is performed successively, the excitement is performed in the state of a strong (forced) excitation.

On the other hand, when a high-voltage pulse of almost 700 V, with a repetitive frequency of 100 Hz and a pulse width of 500 ns, is applied to the KPT crystal 5, the KPT crystal 5 operates as the O-wavelength plate in the laser resonator. Consequently, laser oscillation can be realized, and thereby the KPT crystal operates as the Q switch laser.

On this occasion, since the output mirror 7 has a high reflection coefficient for the laser fundamental wave (wavelength 1064 nm) and a high transmission coefficient for the laser two-times wave (wavelength 532 nm), the laser fundamental wave is locked up in the laser resonator, and thereby the light intensity rises up in the laser resonator. Consequently, the conversion of the laser wave to the two-times wave can be effectively performed by use of the KTP crystal 5. Accordingly, the laser fundamental wave can be effectively converted to the two-times wave and a high-peak output of the laser two-times wave can be obtained.

Further, by disposing the etalon element 4 in the resonator, the longitudinal mode number of the laser fundamental wave causing the decrease of the output peak value is reduced. Therefore, a high output power can be achieved.

Figure 2:
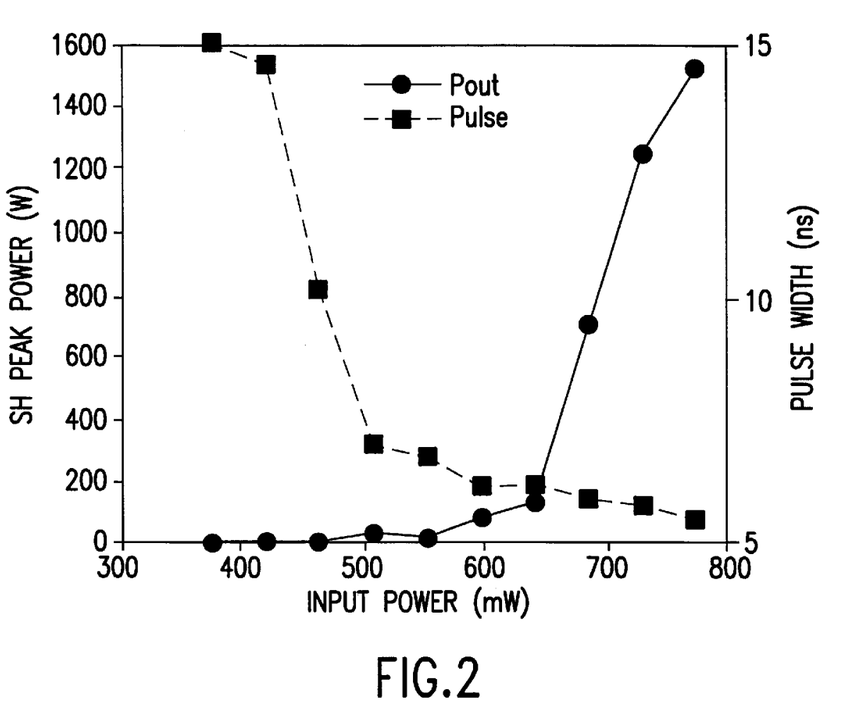
FIG. 2 is a graph showing output characteristic of the solid-state laser apparatus shown in FIG. 1.

FIG. 2 shows an output characteristic of the solid-state laser apparatus having the structure of the first embodiment shown in FIG. 1. In addition, FIG. 3 shows a maximum output light pulse waveform generated by the solid-state laser apparatus shown in FIG. 1.

Figure 3:
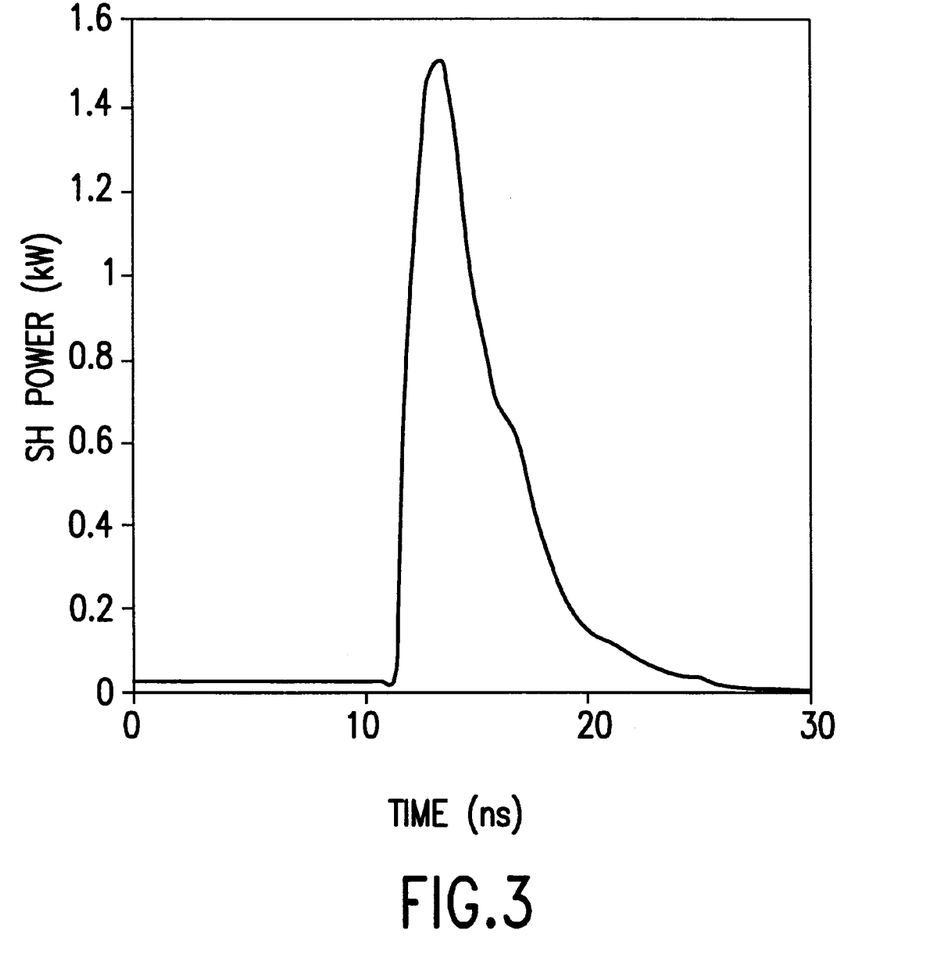
FIG. 3 is a graph showing a maximum output light pulse waveform generated by the solid-state laser apparatus shown in FIG. 1.

As shown in FIG. 2 and FIG. 3, the maximum output is equal to 1500 W when the laser element is excited with a power of 780 mW. Since the maximum output of the background laser apparatus was 230 W (as discussed previously), it was determined that a high-output laser apparatus could be realized by disposing the etalon element 4 therein. Furthermore, the pulse width was 5.6 ns (corresponding to 780 mW excitement), which resulted in 8.4 μJ (drive energy) high energy output.

Figure 4:
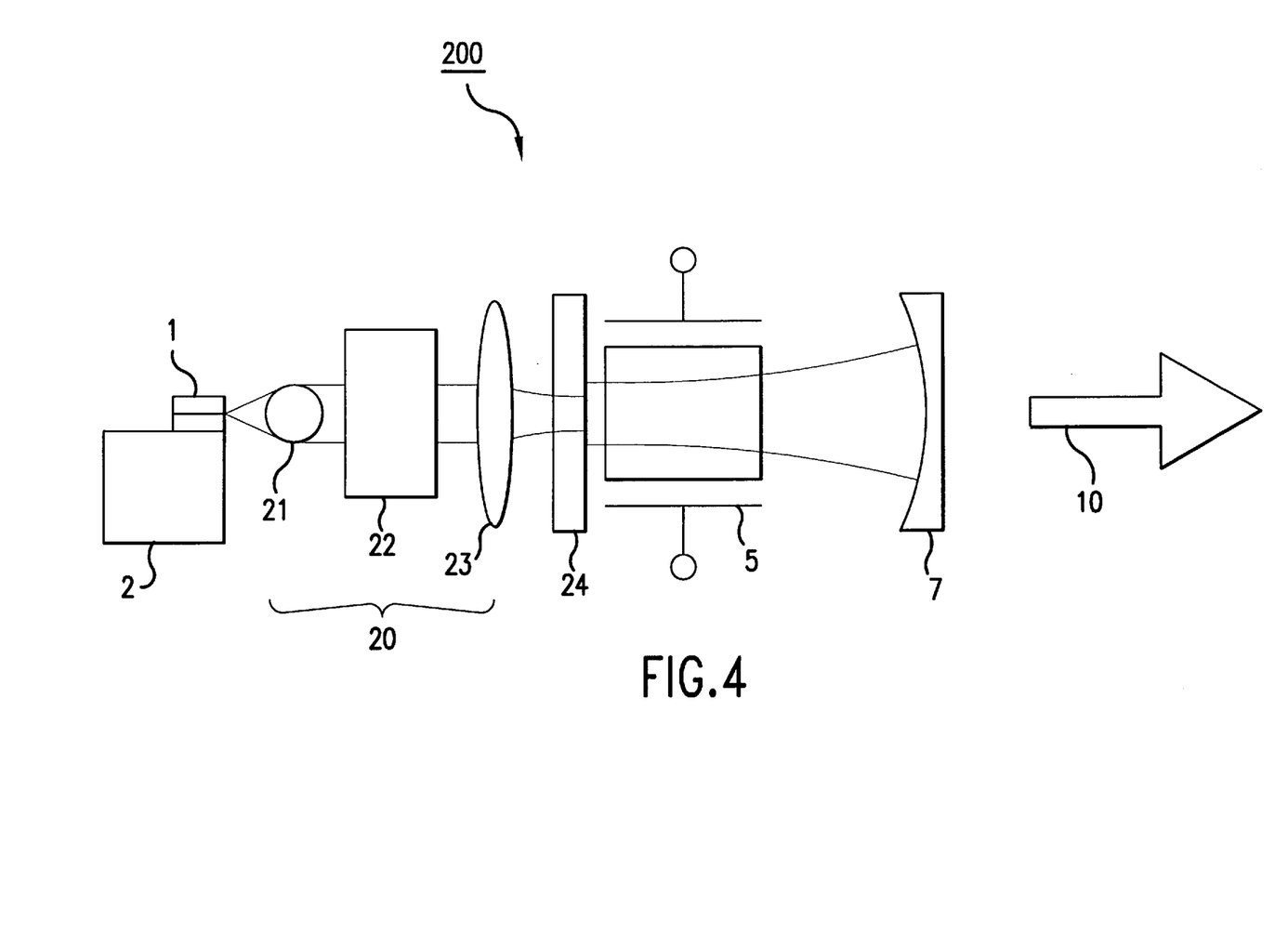
FIG. 4 is a diagram for illustrating a construction of a solid-state laser apparatus according to a second embodiment of the present invention.

FIG. 4 shows a construction of a solid-state laser apparatus 200 according to a second embodiment of the present invention. The apparatus 200 includes a semiconductor laser 1, a thermo-module (T-E cooler)/heat radiating copper block 2 (cooling element), an optical system 20 for focusing light from the semiconductor laser, a laser crystal 24, a non-linear wave converting element 5, and an output mirror 7. The semiconductor laser 1, the non-linear wavelength converting element 5, and the output mirror 7 are the same as those discussed in the first embodiment.

The optical system 20 for focusing the semiconductor laser light rays has a structure of arranging, in order, a rod lens 21 having a lens characteristic of 0.3 mm (for collimating a light component radiated (emitted) in a direction perpendicular to a semiconductor lamination layer film surface of the semiconductor laser 1, a rod lens 22 having a lens characteristic of 1.6 mm φ for collimating a light component radiated (emitted) in a direction parallel with the semiconductor lamination layer film surface of the semiconductor laser, and a light-focusing non-spherical surface lens 23 having a focal distance of 3.3 mm. The excited light rays pass through the optical system 20 and are directed onto the laser crystal 24 as incident light rays.

The Nd:YVO$_4$ crystal with a density of Nd equal to 1.0 at % may be employed as the laser crystal 24. A thickness of the crystal in the optical axis direction may be 0.5 mm and a square measure of the surface perpendicular to the optical axis may be 3 mm (length)×3 mm (width).

Further, the Nd:YVO$_4$ crystal is disposed such that the c-axis of the Nd:YVO$_4$ crystal coincides with the polarizing direction of the semiconductor laser 1, and the side end surface at the side of the semiconductor laser 1 is coated with a dielectric substance multiple layer film so that the reflection coefficient is 99.9% for the laser fundamental wave (light having a wavelength 1064 nm) and the transmission coefficient is 95% for the light excited from the semiconductor laser 1 (light having a wavelength 809 nm).

In addition, the other side end surface thereof at the laser resonator side is coated with a dielectric substance multiple layer film so that end surface has a partial reflection coefficient (i.e., the reflection coefficient is 10%) for the laser fundamental wave (light having a wavelength 1064 nm), the reflection coefficient is 99.9% for the laser two-times wave (light having a wavelength 532 nm), and the reflection coefficient is 95% for the exciting light from the semiconductor laser 1 (light having a wavelength 809 nm).

In such a structure as mentioned above, a light path length of the excited light having the wavelength of 809 nm is 1.0 mm and the absorption of light can be performed sufficiently. Furthermore, since the thickness of the laser crystal 24 can be made equal to 0.5 mm, the etalon effect exerted by the laser crystal 24 can be made large.

The operation of the solid-state laser apparatus 200 is almost the same as that of the solid-state laser apparatus 100 of the first embodiment. The characteristic of the operation of the solid-state laser apparatus 200 is that the side end surface of the laser crystal 24 at the laser resonator side has a partial reflection coefficient of almost 10% for the laser fundamental wave and a high reflection coefficient for the laser two-times wave. Further, the laser crystal 24 exerts the etalon effect on the laser wave. Consequently, a lengthwise mode number of the laser fundamental wave is decreased. Moreover, it is possible to suppress the amount of the incident light rays (the laser two-times wave) directed onto the laser crystal 24 and to prevent the up-conversion thereof. As a result, the output of the laser two-times wave is further raised.

Further, a single stripe semiconductor laser with a 1 W output may be used as the exciting semiconductor laser 1. However, the semiconductor laser 1 is not limited to this structure. For instance, a fiber-output semiconductor laser of a 10 W class could be used. Moreover, although the Nd:YVO$_4$ crystal is employed as the laser crystal, a Nd:LSB [LaSc3(BO$_3$)$_4$] crystal can alternatively be used. In addition, although the KTP crystal is used as the Pockels cell/non-linear optical element 5, the element 5 is not limited to that. Namely, an element with a material exerting a large optoelectronic effect and having a large effective non-linear constant can also be used.

As is apparent from the foregoing description, according to the solid-state laser apparatus of the present invention, a frequency selecting element is disposed in an interior of the laser resonator. Further, an etalon element for the frequency selecting element is preferably employed in the laser apparatus. In such a structure, an efficiency of a Q switch can be improved by reducing a length mode number of the laser fundamental wave. Consequently, the laser output can be raised.

Further, since one side end surface of the laser crystal at the resonator side has a partial reflection coefficient for the laser fundamental wave, it follows that the laser crystal has a function to operate as a frequency selecting element. For this reason, a number of employed parts can be reduced and a cost of the apparatus can also be reduced.

In addition, since one side end surface of the laser crystal at the resonator side has a partial reflection coefficient for the laser fundamental wave and a high reflection coefficient for the laser two-times wave, the laser two-times wave is not directed onto the laser crystal as incident light rays, and thereby the up-conversion of the laser crystal can be prevented. Consequently, the output of the solid-state laser apparatus can be further raised.

Furthermore, according to the solid-state laser apparatus of the present invention, the partial reflection coefficient at the resonator side of one side end surface of the laser crystal is set to a value less than 100%, and thereby it is possible to obtain higher output.

Obviously numerous additional modifications and variations of the present invention are possible in light of the above teachings. It is therefore to be understood that, within the scope of the appended claims, the present invention may be practiced otherwise than as specifically described herein.

The present application is based on Japanese Priority document JP no. 08-255386, which is incorporated herein by reference.

What is claimed as new and desired to be secured by Letters Patents of the United States is:

1. A solid-state laser apparatus, comprising:
   a laser crystal which generates a fundamental laser wave; and
   a semiconductor laser disposed adjacent to a resonator cavity to pump said laser crystal;
   the resonator cavity including:
      the pumped laser crystal;
      a Q-switch non-linear optical crystal to produce a frequency which is twice the frequency of the fundamental laser wave and to absorb light within the resonator cavity so as to produce a laser pulse when a potential is applied to electrodes of the Q-switch non-linear optical crystal; and
      an etalon disposed between the laser crystal and the Q-switch non-linear optical crystal so as to reduce longitudinal modes of the produced laser pulse, resulting in a high output power when the potential is applied to the electrodes of the Q-switch non-linear optical crystal.

2. A solid-state laser apparatus, comprising:
   a laser crystal which generates a fundamental laser wave; and
   a semiconductor laser disposed adjacent to a resonator cavity to pump said laser crystal;
   the resonator including:
      the pumped laser crystal; and
      a Q-switch non-linear optical crystal to produce a frequency which is twice the frequency of the fundamental laser wave and to absorb light within the resonator cavity so as to produce a laser pulse when a potential is applied to electrodes of the Q-switch non-linear optical crystal,
   wherein a surface of said laser crystal includes a coating having a predetermined partial reflection coefficient corresponding to said fundamental laser wave so as to reduce longitudinal modes of the produced laser pulse, resulting in a high output power when the potential is applied to the electrodes of the Q-switch non-linear optical crystal.

3. The solid-state laser apparatus as defined in claim 2, wherein said surface of said laser crystal is coated with a substance to create a high reflection coefficient corresponding to said frequency of said laser pulse.

4. The solid-state laser apparatus as defined in claim 2, wherein the predetermined partial reflection coefficient is less than 100%.

5. A method of operating a solid state laser apparatus which includes a laser crystal, a semiconductor laser disposed adjacent to a resonator cavity, the resonator cavity including the laser crystal, a Q-switch non-linear optical crystal, and an etalon disposed between the laser crystal, and the Q-switch non-linear optical crystal, the method comprising the steps of:
   pumping, with the semiconductor laser, the laser crystal so as to generate a fundamental laser wave;
   producing, with said Q-switch non-linear optical crystal, a frequency which is twice the frequency of the fundamental laser wave;
   absorbing, with said Q-switch non-linear optical crystal, light within the resonator cavity;
   applying a potential to electrodes of the Q-switch non-linear optical crystal to produce a laser pulse; and
   reducing, by the etalon, longitudinal modes of the produced laser pulse, resulting in a high output power when the applying step applies the potential to the electrodes of the Q-switch non-linear optical crystal.

6. A method of operating a solid state laser apparatus which includes a laser crystal, a semiconductor laser disposed adjacent to a resonator cavity, the resonator cavity including the laser crystal and Q-switch non-linear optical crystal, the method comprising the steps of:
   pumping, with the semiconductor laser, the laser crystal so as to generate a fundamental laser wave;
   producing, with said Q-switch non-linear optical crystal, a frequency which is twice the frequency of the fundamental laser wave;
   absorbing, with said Q-switch non-linear optical crystal, light within the resonator cavity; and
   applying a potential to electrodes of the Q-switch non-linear optical crystal to produce a laser pulse,
   wherein a first surface of said laser crystal is coated so as to have a predetermined partial reflection coefficient corresponding to said fundamental laser wave, thereby reducing longitudinal modes of the produced laser pulse, resulting in a high output power when the applying step applies the potential to the electrodes of the Q-switch non-linear optical crystal.

7. The method as defined in claim 6, wherein the coating comprises a high reflection coefficient corresponding to said frequency of said laser pulse.

8. The method as defined in claim 6, wherein the predetermined partial reflection coefficient is less than 100%.

9. A solid-state laser apparatus comprising:
   a laser crystal which generates a fundamental laser wave;
   a semiconductor laser disposed adjacent to a resonator cavity to pump said laser crystal;
   a cooling element which cools said semiconductor laser; and
   an output mirror;
   the resonator cavity including:
      the output mirror;
      the pumped laser crystal;

a Q-switch non-linear optical crystal to produce a frequency which is twice the frequency of the fundamental laser wave and to absorb light within the resonator cavity so as to produce a laser pulse when a potential is applied to electrodes of the Q-switch non-linear optical crystal; and an etalon disposed between the laser crystal and the Q-switch non-linear optical crystal so as to reduce longitudinal modes of the produced laser pulse, resulting in a high output power when the potential is applied to the electrodes of the Q-switch non-linear optical crystal.

10. The solid-state laser apparatus as defined in claim 9, wherein said cooling element is a thermo-module radiating copper block.

11. The solid-state laser apparatus as defined in claim 9, wherein said semiconductor laser is a single stripe semiconductor laser comprising a wavelength of approximately 800–820 nm, a maximum output of approximately 1 W, a stripe width of approximately 90–110 μm, and a light emitting size of approximately 100×1 μm.

12. The solid-state laser apparatus as defined in claim 9, wherein said laser crystal comprises a Nd:YVO$_4$ crystal.

13. The solid-state laser apparatus as defined in claim 12, wherein a density of Nd in said Nd:YVO$_4$ crystal is approximately 0.5–2.0 at %.

14. The solid-state laser apparatus as defined in claim 12, wherein a thickness in an optical axis direction of said laser crystal is approximately 0.5–2.0 mm.

15. The solid-state laser apparatus as defined in claim 12, wherein a surface of said laser crystal perpendicular to an optical axis of said laser crystal has a longitudinal width of approximately 2–4 mm and a transverse width of approximately 2–4 mm.

16. The solid-state laser apparatus as defined in claim 12, wherein said Nd:YVO$_4$ crystal is disposed so that a c-axis of said Nd:YVO$_4$ crystal coincides with a polarizing direction of said semiconductor laser.

17. The solid-state laser apparatus as defined in claim 16, wherein a first side end surface at a side of said semiconductor laser is coated with a dielectric substance multiple layer film so that a reflection coefficient is approximately 99.9% corresponding to a laser fundamental wave having a wavelength of 1064 nm, a reflection coefficient is approximately 99–100% corresponding to a laser two-times wave having a wavelength of 532 nm, and a transmission coefficient is approximately 92–98% corresponding to light excited from said semiconductor laser having a wavelength of 809 nm.

18. The solid-state laser apparatus as defined in claim 17, wherein a second side end surface at a side of laser resonator is coated with a dielectric substance multiple layer film so that a transmission coefficient is approximately 99–100% corresponding to the laser fundamental wave having the wavelength of 1064 nm, and a transmission coefficient is approximately 99–100% corresponding to the laser two-times wave having the wavelength of 532 nm.

19. The solid-state laser apparatus as defined in claim 9, wherein said etalon element comprises a polished optical glass having a thickness of approximately 0.5 mm.

20. The solid-state laser apparatus as defined in claim 9, wherein said non-linear wavelength converting element comprises a KTP crystal, and wherein both side end surfaces of said KTP crystal are coated with a dielectric substance multiple layer film so that a transmission coefficient is approximately 99–100% corresponding to a laser fundamental wave having a wavelength of 1064 nm, and a transmission coefficient is approximately 99–100% corresponding to a laser two-times wave having a wavelength of 532 nm.

21. The solid-state laser apparatus as defined in claim 20, wherein said laser crystal comprises a NdI:YVO$_4$ crystal, wherein said KTP crystal is disposed so that an angle between a c-axis direction of said KTP crystal and a c-axis direction of the Nd:YVO$_4$ crystal is 45° to realize TYPE 11 phase matching, wherein a thickness of said KTP crystal in a first axis direction is 5 mm, in a second axis direction is 1mm, and in a third axis direction is 3 nm, wherein said KTP crystal has been cut along a plane, which has been rotated by 23.4° from its YZ plane around a z-axis, in which the z-axis coincides with that of the c-axis, and wherein an electrode of said KPT crystal is disposed so as to apply an electric field in the c-axis direction to apply a Q switch high-voltage pulse thereto.

22. The solid state laser apparatus as defined in claim 9, wherein said output mirror comprises a same optical glass material as that used in said etalon element, wherein said output mirror comprises a concave surface having a curvature radius of approximately 50 mm resulting in a resonator length of approximately 25 mm, and wherein the concave surface of said output mirror is coated with a dielectric substance multiple layer film so that a reflection coefficient is approximately 99–100% corresponding to a laser fundamental wave having a wavelength of 1064 nm and a transmission coefficient is approximately 92–98% corresponding to a laser two-times wave having a wavelength of 532 nm.

23. A solid-state laser apparatus comprising:

a laser crystal which generates a fundamental laser wave;

a semiconductor laser disposed adjacent to a resonator cavity to pump said laser crystal;

a cooling element which cools said semiconductor laser;

an optical system disposed between the semiconductor laser and the laser crystal to focus light pumped by said semiconductor laser to the laser crystal; and an output mirror;

the resonator cavity including:
the output mirror;
the pumped laser crystal; and
a Q-switch non-linear optical crystal to produce a frequency which is twice the frequency of the fundamental laser wave and to absorb light within the resonator cavity so as to produce a laser pulse when a potential is applied to electrodes of the Q-switch non-linear optical crystal, wherein a first surface of said laser crystal facing the semiconductor laser includes a coating having a predetermined partial reflection coefficient corresponding to said fundamental laser wave so as to reduce longitudinal modes of the produced laser pulse, resulting in a high output power when the potential is applied to the electrodes of the Q-switch non-linear optical crystal.

24. The solid-state laser apparatus as defined in claim 23, wherein said optical system comprises:

a first lens having a diameter of approximately 0.3 mm to collimate a light component emitted in a direction perpendicular to a semiconductor lamination layer film surface of said semiconductor laser;

a second lens having a diameter of approximately 1.6 mm to collimate a light component emitted in a direction parallel to the semiconductor lamination layer film surface of said semiconductor laser; and a light-focusing non-spherical surface lens having a focal distance of 3.3 mm, wherein excited light rays which pass through said optical system are directed onto said laser crystal as incident light rays.

25. The solid-state laser apparatus as defined in claim 23, wherein said laser crystal comprises a Nd:YVO$_4$ crystal.

26. The solid-state laser apparatus as defined in claim 25, wherein a density of Nd in said Nd:YVO$_4$ crystal is approximately 0.5–2.0 at %.

27. The solid-state laser apparatus as defined in claim 23, wherein a thickness of said laser crystal in an optical axis direction is approximately 0.5–2.0 mm.

28. The solid-state laser apparatus as defined in claim 23, wherein a surface of said laser crystal perpendicular to an optical axis of said laser crystal has a longitudinal width of approximately 2–4 mm and a transverse width of approximately 2–4 mm.

29. The solid-state laser apparatus as defined in claim 28, wherein said laser crystal comprises a Nd:YVO$_4$ crystal, wherein said Nd:YVO$_4$ crystal is disposed so that a c-axis of said Nd:YVO$_4$ crystal coincides with a polarizing direction of said semiconductor laser, and the first surface of said semiconductor laser is coated with a dielectric substance multiple layer film so that a reflection coefficient is approximately 99–100% corresponding to a laser fundamental wave having a wavelength 1064 nm and a transmission coefficient is approximately 92–98% corresponding to light excited from said semiconductor laser having a wavelength of 809 nm.

30. The solid-state laser apparatus as defined in claim 29, wherein a second surface of said Nd:YVO$_4$ crystal at a laser resonator side is coated with a dielectric substance multiple layer film so that said second side end surface has a partial reflection coefficient of approximately 10% corresponding to a laser fundamental wave having a wavelength of 1064 nm, a reflection coefficient is approximately 99–100% corresponding to a laser two-times wave having a wavelength of 532 nm, and a reflection coefficient is approximately 92–98% corresponding to light excited from said semiconductor laser having a wavelength of 809 nm.

31. The solid-state laser apparatus as defined in claim 23, wherein said semiconductor laser comprises a single stripe semiconductor laser having an output of approximately 1 W.

32. The solid-state laser apparatus as defined in claim 23, wherein said semiconductor laser comprises a fiber-output semiconductor laser having an output of approximately 10 W.

33. The solid-state laser apparatus as defined in claim 23, wherein said laser crystal comprises a Nd:LSB[LaSc$_3$(BO$_3$)$_4$] crystal.

34. The solid-state laser apparatus as defined in claim 23, wherein said non-linear optical element comprises a KTP crystal.

35. The solid-state laser apparatus as defined in claim 23, wherein said non-linear optical element comprises a material having a large optoelectronic effect and a large effective non-linear constant.

36. A method of operating a solid-state laser apparatus which includes a laser crystal, a semiconductor laser disposed adjacent to a resonator cavity, and a cooling element, the resonator cavity including the laser crystal, a Q-switch non-linear optical crystal, an output mirror and an etalon disposed between the laser crystal and the Q-switch non-linear optical crystal, the method comprising the steps of:

pumping, with the semiconductor laser, the laser crystal so as to generate a fundamental laser wave; and producing, with said Q-switch non-linear optical crystal, a frequency which is twice the frequency of the fundamental laser wave;

absorbing, with said Q-switch non-linear optical crystal, light within the resonator cavity;

applying a potential to electrodes of the Q-switch non-linear optical crystal to produce a laser pulse;

reducing, by the etalon, longitudinal modes of the produced laser pulse, resulting in a high output power when the applying step applies the potential to the electrodes of the Q-switch non-linear optical crystal;

cooling said semiconductor laser with said cooling element.

37. The method as defined in claim 36, wherein said cooling element comprises a thermo-module radiating copper block.

38. The method as defined in claim 36, wherein said semiconductor laser comprises a single stripe semiconductor laser having a wavelength of approximately 820 nm, a maximum output of approximately 1 W, a stripe width of approximately 90–110 nm, and a light emitting size of approximately 100×1 $\mu$m.

39. The method as defined is claim 36, wherein said laser crystal comprises a Nd:YVO$_4$ crystal.

40. The method as defined in claim 39, wherein a density of Nd in said Nd:YVO$_4$ crystal is approximately 0.5–2.0 at %.

41. The method as defined in claim 39, wherein a thickness in an optical axis direction of said laser crystal is approximately 0.5–2.0 mm.

42. The method as defined in claim 39, wherein a surface of said laser crystal perpendicular to an optical axis of said laser crystal has a longitudinal width of approximately 2–4 mm and a transverse width of approximately 2–4 mm.

43. The method as defined in claim 39, wherein said Nd:YVO$_4$ crystal is disposed so that a c-axis of said Nd:YVO$_4$ crystal coincides with a polarizing direction of said semiconductor laser.

44. The method as defined in claim 43, wherein a first side end surface at a side of said semiconductor laser is coated with a dielectric substance multiple layer film so that a reflection coefficient is approximately 99.9% corresponding to a laser fundamental wave having a wavelength of 1064 nm, a reflection coefficient is approximately 99–100% corresponding to a laser two times wave having a wavelength of approximately 532 nm, and a transmission coefficient is approximately 92–98% corresponding to light excited from said semiconductor laser having a wavelength of 809 nm.

45. The method as defined in claim 44, wherein a second side end surface at a side of said laser resonator is coated with a dielectric substance multiple layer film so that a transmission coefficient is approximately 99–100% corresponding to the laser fundamental wave having the wavelength of 1064 nm, and a transmission coefficient is approximately 99–100% corresponding to the laser-two times wave having the wavelength of 532 nm.

46. The method as defined in claim 36, wherein said etalon element comprises a polished optical glass having a thickness of approximately 0.5 mm.

47. The method as defined in claim 41, wherein said non-linear wavelength converting element comprises a KTP crystal, and wherein both side end surfaces of said KTP crystal are coated with a dielectric multiple layer film so that a transmission coefficient is approximately 99–100% corresponding a laser fundamental wave having a wavelength of 1064 nm, and a transmission coefficient is approximately 99–100% corresponding to a laser two-times wave having a wavelength of 532 nm.

48. The method as defined in claim 47, wherein said laser crystal comprises a Nd:YVO$_4$ crystal, wherein said KTP crystal is disposed so that an angle between a c-axis direction of said KTP crystal and a c-axis direction of the Nd:YVO$_4$ crystal is 45° to realize TYPE 11 phase matching, wherein a thickness of said KTP crystal in a first axis direction is 5 mm, in a second axis direction is 1 mm, and in a third axis direction is 3 mm, wherein said KTP crystal has been cut along a plane, which has been rotated by 23.4° from its YZ plane around a z-axis, in which the z-axis coincides with that of the c-axis, and wherein an electrode of said KPT crystal is disposed so as to apply an electric field in the c-axis direction to apply a Q-switch high-voltage pulse thereto.

49. The method as defined in claim 36, wherein said output mirror comprises a concave surface having a curvature radius of approximately 50 mm resulting in a resonator length of approximately 25 mm, and wherein the concave surface of said output mirror is coated with a dielectric substance multiple layer film so that a reflection coefficient is approximately 99–100% corresponding to a laser fundamental wave having a wavelength of 1064 nm and a transmission coefficient is approximately 92–98% corresponding to a laser two-times wave having a wavelength of 532 nm.

50. A method of operating a solid-state laser apparatus which includes a laser crystal, a semiconductor laser disposed adjacent to a resonator cavity, a cooling element, and an optical system, the resonator including the laser crystal and a Q-switch non-linear optical crystal, the method comprising the steps of:

pumping, with the semiconductor laser, the laser crystal so as to generate a fundamental laser wave;

focusing light pumped by the semiconductor laser to the laser crystal;

producing, with said Q-switch non-linear optical crystal, a frequency which is twice the frequency of the fundamental laser wave;

absorbing, with said Q-switch non-linear optical crystal, light within the resonator cavity;

applying a potential to electrodes of the Q-switch non-linear optical crystal to produce a laser pulse; and cooling said semiconductor laser with said cooling element, wherein a first surface of said laser crystal is coated so as to have a predetermined partial reflection coefficient corresponding to said fundamental laser wave, thereby reducing longitudinal modes of the produced laser pulse, resulting in a high output power when the applying step applies the potential to the electrodes of the Q-switch non-linear optical crystal.

51. The method as defined in claim 50, wherein said optical system comprises:

a first lens having a diameter of approximately 0.3 mm to collimate a light component emitted in a direction perpendicular to a semiconductor lamination layer film surface of said semiconductor laser;

a second lens having diameter of approximately 1.6 mm to collimate a light component emitted in a direction parallel to the semiconductor lamination layer film surface of said semiconductor laser; and a light-focusing non-spherical surface lens having a focal distance of 3.3 mm, wherein exciting light rays which pass through said optical system are directed onto said laser crystal as incident light rays.

52. The method as defined in claim 50, wherein said laser crystal comprises a Nd:YVO$_4$ crystal.

53. The method as defined in claim 50, wherein a density of Nd in said Nd:YVO$_4$ crystal is approximately 0.5–2.0 at %.

54. The method as defined in claim 50, wherein a thickness of said laser crystal in an optical axis direction is approximately 0.5–2.0 mm.

55. The method as defined in claim 50, wherein a surface of said laser crystal perpendicular to an optical axis of said laser crystal has a longitudinal width of approximately 2–4 mm and a transverse width of approximately 2–4 mm.

56. The method as defined in claim 55, wherein said laser crystal comprises a Nd:YVO$_4$ crystal, wherein said Nd:YVO$_4$ crystal is disposed such that a c-axis of said Nd:YVO$_4$ crystal coincides with a polarizing direction of said semiconductor laser, and the first side end surface of said semiconductor is coated with a dielectric substance multiple layer film so that a reflection coefficient is approximately 99–100% corresponding to a laser fundamental wave having a wavelength of 1064 nm and a transmission coefficient is approximately 92–98% corresponding to light excited from said semiconductor laser having a wavelength of 809 nm.

57. The method as defined in claim 56, wherein a second surface of said Nd:YVO$_4$ crystal at a laser resonator side is coated with a dielectric substance multiple layer film so that said second side end surface has a partial reflection coefficient of approximately 10% corresponding to a laser fundamental wave having a wavelength of 1064 nm, a reflection coefficient is approximately 99–100% corresponding to a laser two-times wave having a wavelength of 532 nm, and a reflection coefficient is approximately 92–98% corresponding to light excited from said semiconductor laser having a wavelength of 809 nm.

58. The method as defined in claim 50, wherein said semiconductor laser comprises a single stripe semiconductor laser having an output of approximately 1 W.

59. The method as defined in claim 50, wherein said semiconductor laser comprises a fiber-output semiconductor laser having an output of approximately 10 W.

60. The method as defined in claim 50, wherein said laser crystal comprises a Nd:YVO$_4$ crystal.

61. The method as defined in claim 50, wherein said laser crystal comprises a Nd:LSB [LaSc$_3$(BO$_3$)$_4$] crystal.

62. The method as defined in claim 50, wherein said non-linear optical element comprises a KTP crystal.

63. The method as defined in claim 50, wherein a material exerting a large optoelectronic effect and having a large effective non-linear constant is employed in said solid-state apparatus.

* * * * *